Dec. 19, 1933.  K. F. JACOBSEN  1,939,853
TRANSPORT FOR LAWN MOWERS
Filed Aug. 28, 1929   2 Sheets-Sheet 1
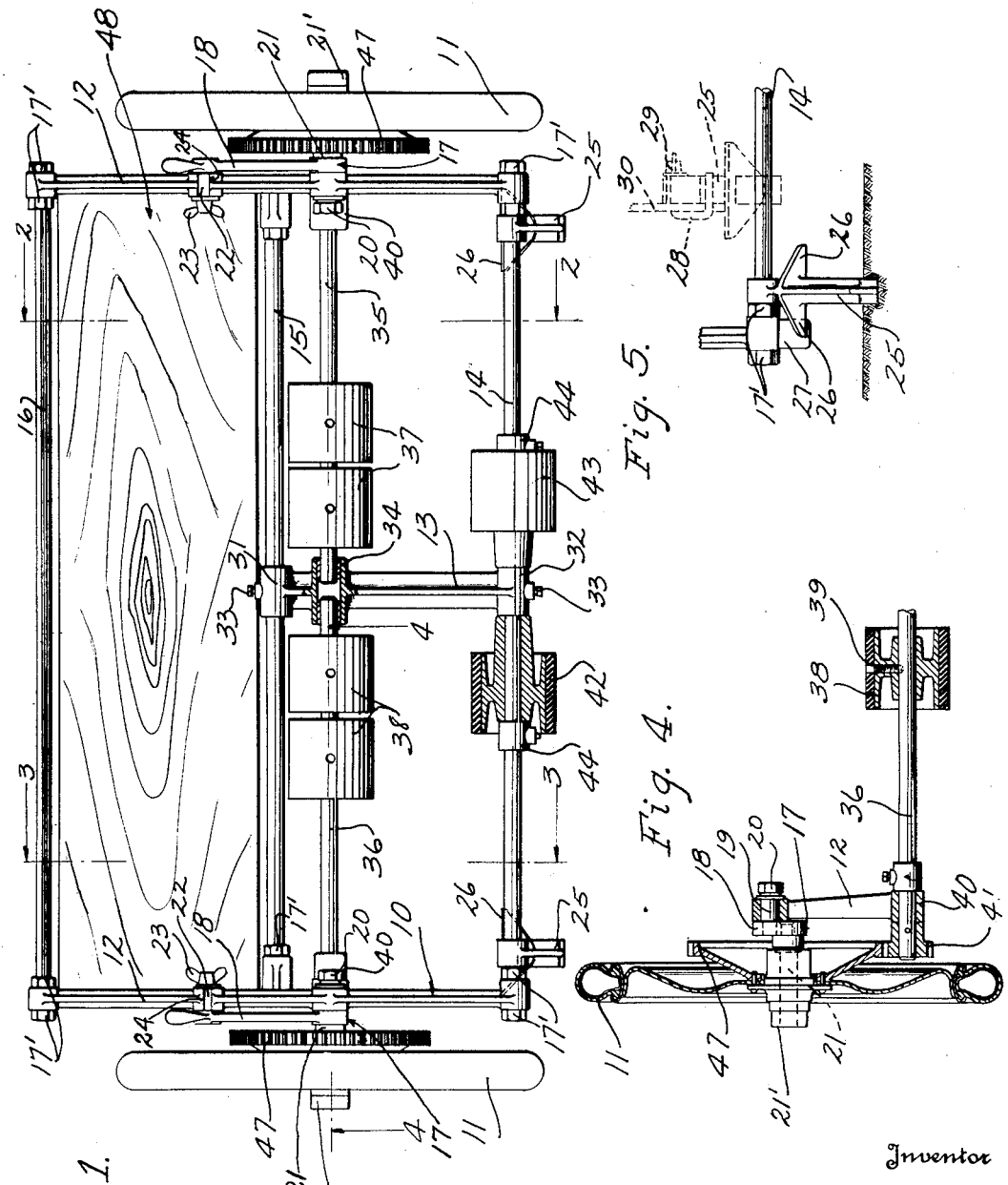
Inventor
K. F. Jacobsen.
By Bottum Hudnall Lecher
McNamara & Michael Attorney

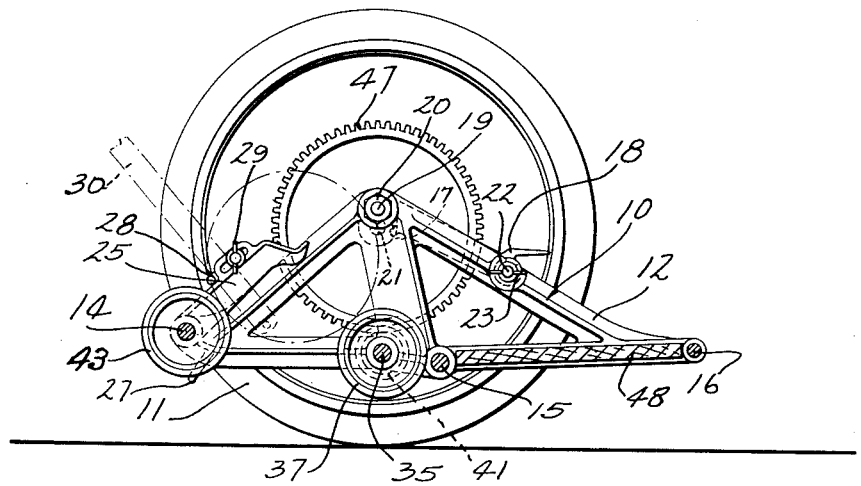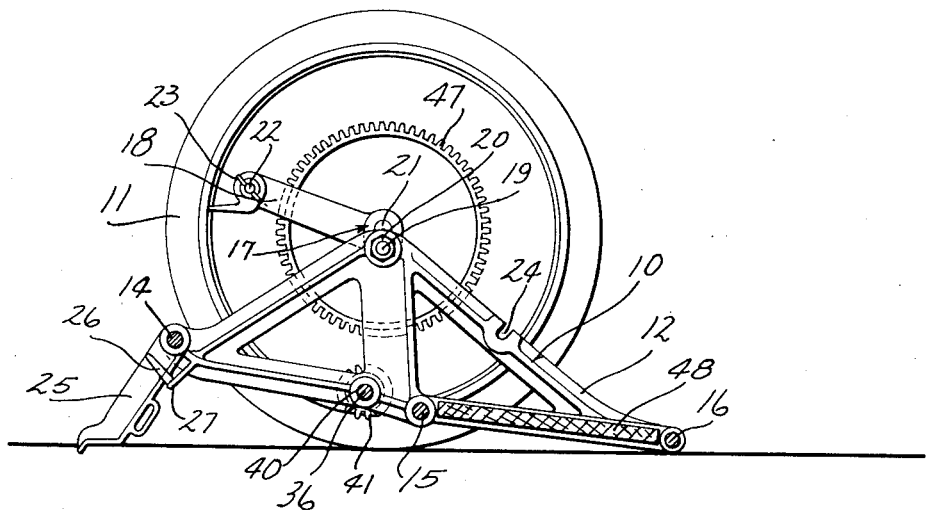

Patented Dec. 19, 1933

1,939,853

UNITED STATES PATENT OFFICE 1,939,853

TRANSPORT FOR LAWN MOWERS

Knud F. Jacobsen, Racine, Wis., assignor to Jacobsen Mfg. Company, Racine, Wis., a corporation of Wisconsin Application August 28, 1929. Serial No. 388,906

7 Claims. (Cl. 180—16)

This invention relates to transports for lawn mowers and more particularly to transports for lawn mowers which have an engine or source of power thereon for moving the mower.

Power mowers, especially those utilized in cutting putting greens must be transported over considerable distances in carrying out their regular schedule of cutting operation. Thus, the mower used for cutting putting greens must travel from green to green over the more or less uneven and sometimes rough fairway. This throws considerable wear and tear on the various mechanisms of the mower and tends to lessen its effectiveness and to shorten its life and in some instances results in damage or breakage of its parts.

One of the principal objects of the present invention is to provide transports for mowers which support and carry mowers from one point of use to another in such manner as to relieve them of danger of unnecessary wear and tear and to protect them from damaging objects, shocks or strains.

A further object is to provide transports which are adapted to be driven by engines or other sources of motive power on mowers.

A power driven mower is usually provided with traction drums or wheels for driving it and the present invention contemplates the use of such means for moving the transport when the mower is placed upon it.

A further object is to provide transports with swinging frames or cradles for carrying mowers, these cradles being properly positioned and balanced to facilitate loading and unloading of mowers thereon.

Other objects and advantages reside in certain novel features of the construction, arrangement and combination of parts which will be hereinafter more fully described and particularly pointed out in the appended claims, reference being had to the accompanying drawings, forming a part of this specification, and in which:

Figure 1 is a plan view of a transport embodying one form of the invention, certain of the parts being shown in cross section to better illustrate the construction;

Figure 2 is a transverse cross sectional view taken on line 2—2 of the transport of Figure 1, this view showing the cradle of the transport in raised position with the traction drum (in dotted lines) of a mower in position thereon;

Figure 3 is a transverse cross sectional view taken on line 3—3 of the transport of Figure 1 showing the cradle in lowered position;

Figure 4 is a fragmentary cross sectional view of the transport taken on line 4—4 of Figure 1; and Figure 5 is a detail front view of a portion of the transport of Figure 1, a skid bar being shown in one position in full lines and in another position in dotted lines.

As shown in Figures 1 to 5 of the drawings, the transport comprises generally a cradle 10 rotatably mounted on a pair of wheels 11.

The cradle 10 is made up of two triangular shaped end pieces 12, an intermediate piece 13, and cross rods 14, 15 and 16 which are rigidly connected to the end pieces by nuts 17' screw threaded thereon.

The means provided for supporting the cradle 10 on the ground wheels 11 is so constituted as to provide for raising the cradle, the cradle being lowered to facilitate loading of the mower thereon and being raised to provide adequate ground clearance when the transport is traveling. In carrying out this purpose a manually operable crank 17 is provided between the upper end of each end piece 12 and the hub of the adjacent wheel. Each crank 17 has integrally formed therewith a handle 18 and at one end has a laterally projecting crank pin or stub shaft 19 rotatably fitted in a bearing provided therefor on the adjacent end piece 12 and held against displacement by means of a nut 20. At the other end of each crank 17 a laterally and outwardly projecting axle 21 is provided, each axle 21 being fitted in the hub of its wheel 11. The usual nut 21' is employed for preventing each wheel 11 from coming off of its axle.

Upon the handles 18 being moved from the positions shown in Figure 2 to that of Figure 3, the whole cradle is lowered with respect to the axles 21, these axles acting as a fulcrum for the handles 18 and the stub shafts 19 traveling from a point above to a point below the axles 21. When the handles are returned to the position shown in Figure 2, so as to raise the cradle, they may be clamped in position by suitable bolts 22 and wing nuts 23 which are carried by the handles and are adapted to interfit with suitable slots 24 in the end pieces.

Slidably and rotatably mounted on the rear cross rod 14 are two skid bars 25, these bars being adapted to rest upon the ground and having points which project into the ground and prevent movement of the transport rearwardly when the mower is being loaded thereon. Each skid bar is provided with a lateral projection 26 adapted to engage a lug 27 on one of the end pieces 12 so as to prevent angular movement between these parts. Figure 5 shows in full lines the position of the skid bar when the mower is being loaded. The dotted line showing in Figure 5 illustrates the position of the skid bar after the mower is loaded. In this position a U-bolt 28 and a wing nut 29 cooperate with the skid bar to clamp the steering bar 30 (shown dotted) of the mower in position and thus rigidly secure the mower to the cradle.

The intermediate frame piece 13 is connected to and braces the cross rods 14 and 15. For this purpose it is provided with integral sleeves 31 and 32 for receiving these cross rods and is held against longitudinal movement thereon by set screws 33 as shown.

The transport is so constructed as to utilize the engine on the mower for driving it. For this purpose the intermediate piece 13 is provided with a journal box 34 for receiving the inner ends of alined drive shafts 35 and 36. The outer ends of the shafts 35 and 36 are journaled in boxes 40 on the end pieces 12 and have pinion gears 41 fixed thereto. Friction rollers 37 and 38 are secured to the shafts 35 and 36, respectively, by set screws 39, such as shown in Figure 4. For cooperating with the drive rollers 37 and 38, the rear shaft 14 has idle rollers 42 and 43 loosely mounted for rotation thereon, but prevented from lateral movement by means of suitable collars 44. With this construction, it will be seen that when the traction drums or other driving elements of a power driven lawn mower are placed upon the rollers 37, 38, 42 and 43, the pinion gears 41 are frictionally clutched thereto. Since the traction drums of the mower are differentially connected to the engine, the pinions 41 may be differentially driven by the engine through the rollers 37 and 38 and the shafts 35 and 36.

The wheels 11 are preferably provided with pneumatic tires so as to minimize the transmission of shocks to the mower and also to prevent injury to fairway or lawn over which the transport may be moved. The inner side of each wheel 11 is provided with a gear 47 adapted to mesh with one or the other of the pinions 41. It will be noted that these gears are not in mesh with the pinions 41 when the cradle is in lowered position as shown in Figure 3 since the pinions 41 move with the cradle while the gears 47 remain stationary with the wheels, but as the cradle is raised to the position shown in Figure 2, these elements are moved into meshing engagement. Thus, when the cradle is in lowered position and a mower is being loaded thereon, the driving rollers 37 and 38 are free to rotate without moving the wheels. This relieves the gear teeth of all strain as the mower is being loaded.

As shown in Figures 1, 2 and 3, a floor board or other suitable flat support 48 is clamped between the opposing end pieces 12 by the rods 15 and 16. This board facilitates loading of the mower and also acts as a support for wheels or idle rollers on the mower after the same has been loaded.

In loading a mower on the transport the cradle is lowered to the position shown in Figure 3 and the skid bars are forced into the ground so as to prevent movement of the transport and to hold the cradle in the angled position shown in this figure. The mower is then placed in a position at the right of Figure 3 and driven or pulled backwardly over the board 48 until the traction drum takes the position between the drive rollers 37 and 38 and the idling rollers 42 and 43, as shown in dotted lines in Figure 2. The skid bar 25 is then moved to the dotted line position of Figure 5 to clamp the mower in position.

In the form of the invention described above, the traction drum of the mower is positioned considerably to the rear of the center line of the cradle. This is done in order to properly balance the cradle which is designed for a mower which has its center of gravity well in advance of the traction drum. It is evident that the device may be so constructed that the rollers 37, 38, 42 and 43 have a different angular relation than that shown with respect to the center of gravity of the cradle so as to adapt the same to carry different types of mowers.

The mower is loaded on the transport either manually or with the aid of its own power. Preferably, even when the mower is loaded manually onto the transport the engine is left running although it is disconnected from the traction drums of the mower by throwing out the clutch usually provided on such power mowers. With the mower properly loaded and secured in position on the transport as above described, the operator, in traveling from place to place uses the handles of the mower for steadying the cradle of the transport and also for steering or guiding the transport. In this connection it is to be remembered that ordinarily a power mower has two traction drums mounted to rotate about a common axis but differentially driven from the power plant of the mower. Applicant's transport is so designed that one of these traction drums drives rollers 38 and their shafts 36 while the other traction drum of the mower drives rollers 37 and their shafts 35. Since the shafts 35 and 36 are supported on the transport for independent rotation, the differential drive of the power plant of the mower is continued to the transport so that the transport may be easily turned or steered. Very slight effort is required of the operator when the mower is being carried from place to place inasmuch as the power drive of the mower is used for propelling the transport and since the weight of the mower is substantially balanced on the cradle.

The invention claimed is:

1. A transport for lawn mowers including a cradle, levers pivotally mounted on the cradle and having outwardly projecting axles secured thereto at points offset from points of mounting on the cradle and wheels mounted on said axles whereby the cradle may be raised and lowered with respect to the wheels by manipulation of said levers, and a set of gears for transmitting power from points on the cradle to the wheels, said gears being thrown into and out of meshing engagement as the cradle is raised and lowered.

2. A transport for lawn mowers including a pair of ground wheels, a cradle tiltably supported on the ground wheels, and skid bars pivoted on the cradle and operable in one position to engage the ground to maintain the cradle tilted and to prevent movement of the transport in one direction, and having means engageable with the lawn mower in another position of the skid bars to aid in holding the lawn mower in position on the cradle.

3. A transport for lawn mowers including a pair of ground wheels, a cradle, means coacting with said ground wheels and said cradle for supporting the cradle on and for raising and lowering the same with respect to the ground wheels, a power drive mounted on the cradle and including driving gears, and driven gears mounted on the wheels and intermeshing with the driving gears in the raised position of the cradle, said driving gears being disengaged from said driven gears in the lowered position of said cradle.

4. A transport including ground wheels, a cradle tiltably supported on the ground wheels, a plurality of rollers on the cradle and adapted and arranged to engage the traction drums of a mower and positioned to one side of the axis of support of the cradle, additional rollers on the cradle having driving connections with said ground wheels whereby the mower may be utilized to propel the transport, and a platform carried by the cradle and positioned to the other side of the axis of support thereof and adapted to provide a support for elements of the mower.

5. A transport including ground wheels, a cradle tiltably supported on the ground wheels, a plurality of rollers on the cradle and adapted and arranged to engage the traction drums of a mower and positioned to one side of the axis of support of the cradle, a platform carried by the cradle and positioned to the other side of the axis of support thereof and adapted to provide a support for elements of the mower and to facilitate loading thereof on the cradle, additional rollers on the cradle and gearing actuated from said last named rollers and connected to said ground wheels whereby the power of the mower may be utilized to propel the transport.

6. A transport including ground wheels, a cradle tiltably supported on the ground wheels, a plurality of rollers on the cradle and adapted and arranged to engage the traction drums of a mower and positioned to one side of the axis of support of the cradle, additional rollers on the cradle having driving connections with said ground wheels whereby the mower may be utilized to propel the transport, a platform carried by the cradle and positioned to the other side of the axis of support thereof and adapted to provide a support for elements of the mower, and releasable means for securing the mower in position on the cradle.

7. A transport for a power driven lawn mower comprising a cradle, levers pivotally connected to the cradle and having axles offset laterally from said pivotal connections, ground wheels rotatable on said axles, said levers being adjustable to lower the cradle to facilitate loading of the mower thereon and to raise the cradle for transportation, said cradle having mower engaging and supporting elements positioned on the opposite sides of the points of suspension of the cradle to provide for the balanced support of said mower, at least certain of said mower engaging and supporting elements being engageable with the traction means of the mower and having driving connection with the ground wheels whereby the power of the mower may be used to propel the transport.

KNUD F. JACOBSEN.